United States Patent
Luo et al.

(10) Patent No.: US 9,735,920 B2
(45) Date of Patent: Aug. 15, 2017

(54) EFFICIENTLY IDENTIFYING SYSTEM WAVEFORM IN UPLINK TRANSMISSION

(71) Applicant: QUALCOMM Incorporated, San Diego, CA (US)

(72) Inventors: Tao Luo, San Diego, CA (US); Juan Montojo, Nuremberg (DE); I-Hsiang Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 120 days.

(21) Appl. No.: 14/561,796

(22) Filed: Dec. 5, 2014

(65) Prior Publication Data

US 2015/0092528 A1 Apr. 2, 2015

Related U.S. Application Data

(62) Division of application No. 12/557,437, filed on Sep. 10, 2009, now Pat. No. 8,913,672.

(Continued)

(51) Int. Cl.
*H04J 11/00* (2006.01)
*H04L 1/00* (2006.01)
(Continued)

(52) U.S. Cl.
CPC .......... *H04L 1/0039* (2013.01); *H04L 1/0025* (2013.01); *H04L 1/0028* (2013.01);
(Continued)

(58) Field of Classification Search
CPC ... H04L 1/0039; H04L 5/0048; H04L 1/0025; H04L 1/0028; H04L 1/0015; H04W 72/0413
See application file for complete search history.

(56) References Cited

U.S. PATENT DOCUMENTS 5,949,268 A    9/1999  Miura et al.
2002/0002052 A1  1/2002  McHenry
(Continued)

FOREIGN PATENT DOCUMENTS

EP    1168700 A2    1/2002
EP    1720369 A1   11/2006
(Continued)

OTHER PUBLICATIONS

International Search Report and Written Opinion—PCT/US2009/056733—International Search Authority—European Patent Office—Apr. 28, 2010.

(Continued)

*Primary Examiner* — Afshawn Towfighi
(74) *Attorney, Agent, or Firm* — Michael J. DeHaemer, Jr.

(57) ABSTRACT

Systems and methodologies are described that facilitate indicating a type of waveform utilized for uplink transmission in a wireless communication environment. An access terminal can select a type of waveform from a set of possible waveform types. Moreover, a reference signal can be generated based upon the selected type of waveform. For instance, a sequence employed to yield the reference signal can be generated and/or chosen as a function of the selected type of waveform. According to another illustration, a tone location and/or a symbol location of the reference signal can as part of the uplink transmission to the base station from the access terminal. The base station can detect the selected type of waveform utilized by the access terminal for the uplink transmission based upon parameter(s) recognized from the reference signal.

19 Claims, 10 Drawing Sheets

Related U.S. Application Data

(60) Provisional application No. 61/096,588, filed on Sep. 12, 2008.

(51) Int. Cl.
*H04L 5/00* (2006.01)
*H04W 72/04* (2009.01)

(52) U.S. Cl.
CPC ....... *H04L 5/0048* (2013.01); *H04W 72/0413* (2013.01); *H04L 1/0015* (2013.01)

(56) References Cited

U.S. PATENT DOCUMENTS

| | | |
|---|---|---|
| 2005/0207383 A1 | 9/2005 | Carsello et al. |
| 2007/0060161 A1 | 3/2007 | Chindapol et al. |
| 2007/0076807 A1 | 4/2007 | Jin et al. |
| 2007/0183386 A1 | 8/2007 | Muharemovic et al. |
| 2008/0014969 A1 | 1/2008 | Laroia et al. |
| 2008/0318608 A1* | 12/2008 | Inoue et al. ........... H04B 1/707 455/509 |
| 2010/0067591 A1 | 3/2010 | Luo et al. |
| 2011/0110323 A1* | 5/2011 | Kim ..................... H04B 7/2621 370/329 |

FOREIGN PATENT DOCUMENTS

| | | |
|---|---|---|
| WO | WO-2008024056 | 2/2008 |
| WO | WO-2008038979 A2 | 4/2008 |

OTHER PUBLICATIONS

Taiwan Search Report—TW098130935—TIPO—Feb. 18, 2013.

* cited by examiner

EFFICIENTLY IDENTIFYING SYSTEM WAVEFORM IN UPLINK TRANSMISSION

CROSS-REFERENCE TO RELATED APPLICATIONS

This is a divisional application of U.S. patent application Ser. No. 12/557,437, filed on Sep. 10, 2009 and assigned U.S. Pat. No. 8,913,672 with an issue date of Dec. 16, 2014, which claims the benefit of U.S. Provisional Patent Application Ser. No. 61/096,588 entitled "METHODS OF EFFICIENTLY IDENTIFYING SYSTEM WAVEFORM IN UPLINK TRANSMISSION" which was filed Sep. 12, 2008. The entirety of the aforementioned applications is herein incorporated by reference.

BACKGROUND

I. Field

The following description relates generally to wireless communications, and more particularly to indicating a type of waveform utilized for uplink transmission in a wireless communication system.

II. Background

Wireless communication systems are widely deployed to provide various types of communication; for instance, voice and/or data can be provided via such wireless communication systems. A typical wireless communication system, or network, can provide multiple users access to one or more shared resources (e.g., bandwidth, transmit power, . . . ). For instance, a system can use a variety of multiple access techniques such as Frequency Division Multiplexing (FDM), Time Division Multiplexing (TDM), Code Division Multiplexing (CDM), Orthogonal Frequency Division Multiplexing (OFDM), and others.

Generally, wireless multiple-access communication systems can simultaneously support communication for multiple access terminals. Each access terminal can communicate with one or more base stations via transmissions on forward and reverse links. The forward link (or downlink) refers to the communication link from base stations to access terminals, and the reverse link (or uplink) refers to the communication link from access terminals to base stations. This communication link can be established via a single-in-single-out, multiple-in-single-out or a multiple-in-multiple-out (MIMO) system.

MIMO systems commonly employ multiple ($N_T$) transmit antennas and multiple ($N_R$) receive antennas for data transmission. A MIMO channel formed by the $N_T$ transmit and $N_R$ receive antennas can be decomposed into $N_S$ independent channels, which can be referred to as spatial channels, where $N_S \leq \{N_T, N_R\}$. Each of the $N_S$ independent channels corresponds to a dimension. Moreover, MIMO systems can provide improved performance (e.g., increased spectral efficiency, higher throughput and/or greater reliability) if the additional dimensionalities created by the multiple transmit and receive antennas are utilized.

MIMO systems can support various duplexing techniques to divide forward and reverse link communications over a common physical medium. For instance, frequency division duplex (FDD) systems can utilize disparate frequency regions for forward and reverse link communications. Further, in time division duplex (TDD) systems, forward and reverse link communications can employ a common frequency region so that the reciprocity principle allows estimation of the forward link channel from reverse link channel.

Wireless communication systems oftentimes employ one or more base stations that provide a coverage area. A typical base station can transmit multiple data streams for broadcast, multicast and/or unicast services, wherein a data stream may be a stream of data that can be of independent reception interest to an access terminal. An access terminal within the coverage area of such base station can be employed to receive one, more than one, or all the data streams carried by the composite stream. Likewise, an access terminal can transmit data to the base station or another access terminal.

Commonly, a single type of waveform is used for uplink transmission by access terminals in conventional wireless communication systems. For instance, in Long Term Evolution (LTE) Release 8, single carrier-frequency division multiple access (SC-FDMA) can be employed on the uplink. Accordingly, a base station in such conventional wireless communication systems can receive, detect, decode, demodulate, etc. an uplink transmission by leveraging a priori knowledge that the uplink transmission is encoded, modulated, sent, etc. by an access terminal using SC-FDMA (e.g., an SC-FDMA waveform is yielded by the access terminal and transmitted via the uplink, . . . ).

SUMMARY

The following presents a simplified summary of one or more embodiments in order to provide a basic understanding of such embodiments. This summary is not an extensive overview of all contemplated embodiments, and is intended to neither identify key or critical elements of all embodiments nor delineate the scope of any or all embodiments. Its sole purpose is to present some concepts of one or more embodiments in a simplified form as a prelude to the more detailed description that is presented later.

In accordance with one or more embodiments and corresponding disclosure thereof, various aspects are described in connection with facilitating indicating a type of waveform utilized for uplink transmission in a wireless communication environment. An access terminal can select a type of waveform from a set of possible waveform types. Moreover, a reference signal can be generated based upon the selected type of waveform. For instance, a sequence employed to yield the reference signal can be generated and/or chosen as a function of the selected type of waveform. According to another illustration, a tone location and/or a symbol location of the reference signal can be based upon the selected type of waveform. Further, the reference signal can be sent as part of the uplink transmission to the base station from the access terminal The base station can detect the selected type of waveform utilized by the access terminal for the uplink transmission based upon parameter(s) recognized from the reference signal.

According to related aspects, a method that facilitates identifying employed waveform type in a wireless communication environment is described herein. The method can include selecting a type of waveform for an uplink transmission. Moreover, the method can include generating a reference signal as a function of the selected type of waveform. Further, the method can include sending the reference signal as part of the uplink transmission.

Another aspect relates to a wireless communications apparatus. The wireless communications apparatus can include a memory that retains instructions related to choosing a type of waveform for an uplink transmission, yielding a demodulation reference signal as a function of the chosen type of waveform, and transmitting the demodulation reference signal as part of the uplink transmission. Further, the wireless communications apparatus can include a processor, coupled to the memory, configured to execute the instructions retained in the memory.

Yet another aspect relates to a wireless communications apparatus that enables indicating employed waveform type in a wireless communication environment. The wireless communication apparatus can include means for yielding a reference signal based upon a type of waveform for an uplink transmission. Moreover, the wireless communications apparatus can include means for transmitting the uplink transmission, which includes the reference signal.

Still another aspect relates to a computer program product that can comprise a computer-readable medium. The computer-readable medium can include code for selecting a type of waveform for an uplink transmission, wherein the type of waveform is selected from a set of possible types of waveforms that includes a single carrier-frequency division multiple access (SC-FDMA) waveform and an orthogonal frequency division multiple access (OFDMA) waveform. Further, the computer-readable medium can include code for generating a demodulation reference signal as a function of the selected type of waveform. Moreover, the computer-readable medium can include code for transmitting the demodulation reference signal as part of the uplink transmission.

In accordance with another aspect, a wireless communications apparatus can include a processor, wherein the processor can be configured to select a type of waveform for an uplink transmission, wherein the type of waveform is selected from a set of possible types of waveforms that includes a single carrier-frequency division multiple access (SC-FDMA) waveform and an orthogonal frequency division multiple access (OFDMA) waveform. Moreover, the processor can be configured to generate a demodulation reference signal as a function of the selected type of waveform. Further, the processor can be configured to send the demodulation reference signal as part of the uplink transmission.

According to other aspects, a method that facilitates recognizing utilized waveform type in a wireless communication environment is described herein. The method can include receiving an uplink transmission that includes a reference signal. The method can also include recognizing a parameter associated with the reference signal. Further, the method can include detecting a type of waveform utilized for the uplink transmission based upon the recognized parameter.

Another aspect relates to a wireless communications apparatus. The wireless communications apparatus can include a memory that retains instructions related to obtaining an uplink transmission that includes a demodulation reference signal, identifying a parameter associated with the demodulation reference signal, and detecting a type of waveform utilized for the uplink transmission based upon the identified parameter. Further, the wireless communications apparatus can include a processor, coupled to the memory, configured to execute the instructions retained in the memory.

Yet another aspect relates to a wireless communications apparatus that enables recognizing utilized waveform type in a wireless communication environment. The wireless communications apparatus can include means for identifying a parameter associated with a reference signal included within a received uplink transmission. Moreover, the wireless communications apparatus can include means for detecting a type of waveform utilized for the uplink transmission as a function of the identified parameter.

Still another aspect relates to a computer program product that can comprise a computer-readable medium. The computer-readable medium can include code for identifying a parameter associated with a reference signal included within a received uplink transmission. Further, the computer-readable medium can include code for detecting a type of waveform utilized for the uplink transmission as a function of the identified parameter.

In accordance with another aspect, a wireless communications apparatus can include a processor, wherein the processor can be configured to receive an uplink transmission that includes a demodulation reference signal. Further, the processor can be configured to recognize a parameter associated with the demodulation reference signal, wherein the parameter is at least one of an identity of a Zadoff-Chu sequence associated with the demodulation reference signal, a symbol location of the demodulation reference signal, or a tone location of the demodulation reference signal. The processor can also be configured to detect a type of waveform utilized for the uplink transmission based upon the recognized parameter. Moreover, the processor can be configured to decode the uplink transmission based upon the detected type of waveform.

Toward the accomplishment of the foregoing and related ends, the one or more embodiments comprise the features hereinafter fully described and particularly pointed out in the claims. The following description and the annexed drawings set forth herein detail certain illustrative aspects of the one or more embodiments. These aspects are indicative, however, of but a few of the various ways in which the principles of various embodiments can be employed and the described embodiments are intended to include all such aspects and their equivalents.

DETAILED DESCRIPTION

Figure 1:
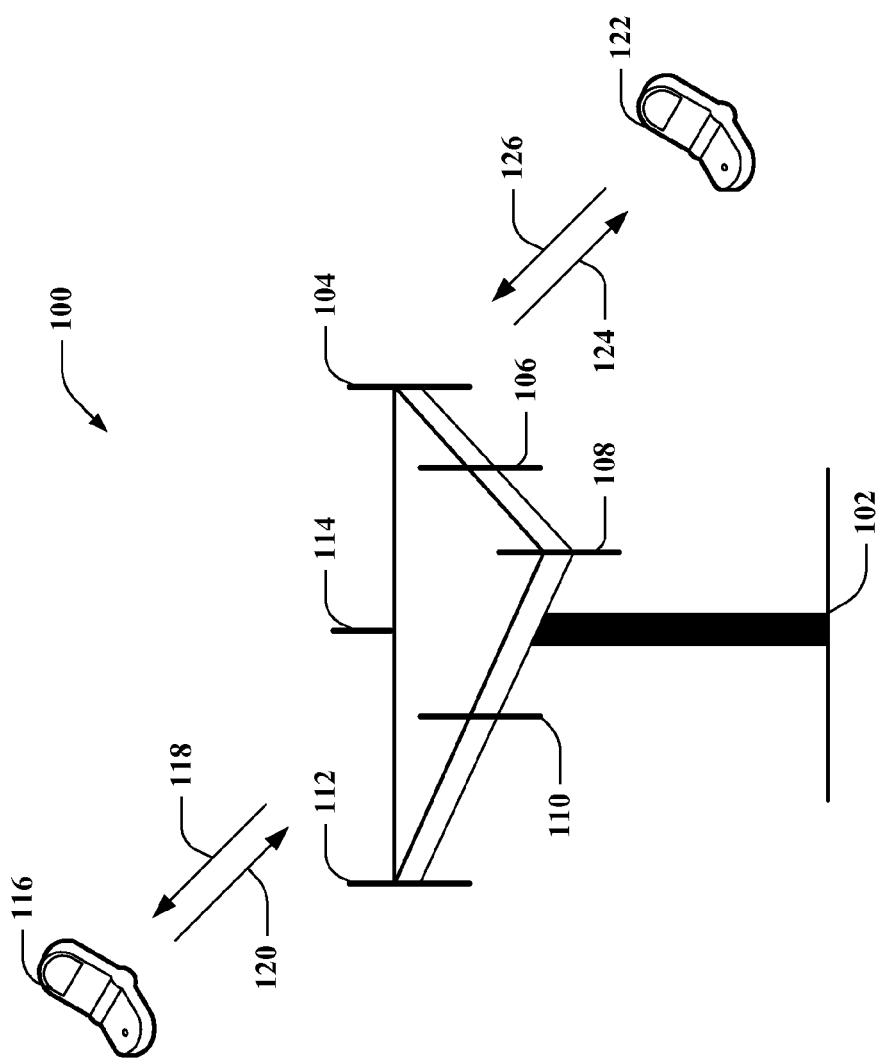
FIG. 1 is an illustration of a wireless communication system in accordance with various aspects set forth herein.

Various embodiments are now described with reference to the drawings, wherein like reference numerals are used to refer to like elements throughout. In the following description, for purposes of explanation, numerous specific details are set forth in order to provide a thorough understanding of one or more embodiments. It may be evident, however, that such embodiment(s) may be practiced without these specific details. In other instances, well-known structures and devices are shown in block diagram form in order to facilitate describing one or more embodiments.

As used in this application, the terms "component," "module," "system," and the like are intended to refer to a computer-related entity, either hardware, firmware, a combination of hardware and software, software, or software in execution. For example, a component can be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component can be localized on one computer and/or distributed between two or more computers. In addition, these components can execute from various computer readable media having various data structures stored thereon. The components can communicate by way of local and/or remote processes such as in accordance with a signal having one or more data packets (e.g., data from one component interacting with another component in a local system, distributed system, and/or across a network such as the Internet with other systems by way of the signal).

The techniques described herein can be used for various wireless communication systems such as code division multiple access (CDMA), time division multiple access (TDMA), frequency division multiple access (FDMA), orthogonal frequency division multiple access (OFDMA), single carrier-frequency division multiple access (SC-FDMA) and other systems. The terms "system" and "network" are often used interchangeably. A CDMA system can implement a radio technology such as Universal Terrestrial Radio Access (UTRA), CDMA2000, etc. UTRA includes Wideband-CDMA (W-CDMA) and other variants of CDMA. CDMA2000 covers IS-2000, IS-95 and IS-856 standards. A TDMA system can implement a radio technology such as Global System for Mobile Communications (GSM). An OFDMA system can implement a radio technology such as Evolved UTRA (E-UTRA), Ultra Mobile Broadband (UMB), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) is an upcoming release of UMTS that uses E-UTRA, which employs OFDMA on the downlink and SC-FDMA on the uplink. UTRA, E-UTRA, UMTS, LTE and GSM are described in documents from an organization named "3rd Generation Partnership Project" (3GPP). Additionally, CDMA2000 and UMB are described in documents from an organization named "3rd Generation Partnership Project 2" (3GPP2). Further, such wireless communication systems can additionally include peer-to-peer (e.g., mobile-to-mobile) ad hoc network systems often using unpaired unlicensed spectrums, 802.xx wireless LAN, BLUETOOTH and any other short- or long-range, wireless communication techniques.

Single carrier frequency division multiple access (SC-FDMA) utilizes single carrier modulation and frequency domain equalization. SC-FDMA has similar performance and essentially the same overall complexity as those of an OFDMA system. A SC-FDMA signal has lower peak-to-average power ratio (PAPR) because of its inherent single carrier structure. SC-FDMA can be used, for instance, in uplink communications where lower PAPR greatly benefits access terminals in terms of transmit power efficiency. Accordingly, SC-FDMA can be implemented as an uplink multiple access scheme in 3GPP Long Term Evolution (LTE) or Evolved UTRA.

Furthermore, various embodiments are described herein in connection with an access terminal. An access terminal can also be called a system, subscriber unit, subscriber station, mobile station, mobile, remote station, remote terminal, mobile device, user terminal, terminal, wireless communication device, user agent, user device, or user equipment (UE). An access terminal can be a cellular telephone, a cordless telephone, a Session Initiation Protocol (SIP) phone, a wireless local loop (WLL) station, a personal digital assistant (PDA), a handheld device having wireless connection capability, computing device, or other processing device connected to a wireless modem. Moreover, various embodiments are described herein in connection with a base station. A base station can be utilized for communicating with access terminal(s) and can also be referred to as an access point, Node B, Evolved Node B (eNodeB, eNB) or some other terminology.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

Various aspects or features described herein can be implemented as a method, apparatus, or article of manufacture using standard programming and/or engineering techniques. The term "article of manufacture" as used herein is intended to encompass a computer program accessible from any computer-readable device, carrier, or media. For example, computer-readable media can include but are not limited to magnetic storage devices (e.g., hard disk, floppy disk, magnetic strips, etc.), optical disks (e.g., compact disk (CD), digital versatile disk (DVD), etc.), smart cards, and flash memory devices (e.g., EPROM, card, stick, key drive, etc.). Additionally, various storage media described herein can represent one or more devices and/or other machine-readable media for storing information. The term "machine-readable medium" can include, without being limited to, wireless channels and various other media capable of storing, containing, and/or carrying instruction(s) and/or data.

Referring now to FIG. 1, a wireless communication system 100 is illustrated in accordance with various embodiments presented herein. System 100 comprises a base station 102 that can include multiple antenna groups. For example, one antenna group can include antennas 104 and 106, another group can comprise antennas 108 and 110, and an additional group can include antennas 112 and 114. Two antennas are illustrated for each antenna group; however, more or fewer antennas can be utilized for each group. Base station 102 can additionally include a transmitter chain and a receiver chain, each of which can in turn comprise a plurality of components associated with signal transmission and reception (e.g., processors, modulators, multiplexers, demodulators, demultiplexers, antennas, etc.), as will be appreciated by one skilled in the art.

Base station 102 can communicate with one or more access terminals such as access terminal 116 and access terminal 122; however, it is to be appreciated that base station 102 can communicate with substantially any number of access terminals similar to access terminals 116 and 122. Access terminals 116 and 122 can be, for example, cellular phones, smart phones, laptops, handheld communication devices, handheld computing devices, satellite radios, global positioning systems, PDAs, and/or any other suitable device for communicating over wireless communication system 100. As depicted, access terminal 116 is in communication with antennas 112 and 114, where antennas 112 and 114 transmit information to access terminal 116 over a forward link 118 and receive information from access terminal 116 over a reverse link 120. Moreover, access terminal 122 is in communication with antennas 104 and 106, where antennas 104 and 106 transmit information to access terminal 122 over a forward link 124 and receive information from access terminal 122 over a reverse link 126. In a frequency division duplex (FDD) system, forward link 118 can utilize a different frequency band than that used by reverse link 120, and forward link 124 can employ a different frequency band than that employed by reverse link 126, for example. Further, in a time division duplex (TDD) system, forward link 118 and reverse link 120 can utilize a common frequency band and forward link 124 and reverse link 126 can utilize a common frequency band.

Each group of antennas and/or the area in which they are designated to communicate can be referred to as a sector of base station 102. For example, antenna groups can be designed to communicate to access terminals in a sector of the areas covered by base station 102. In communication over forward links 118 and 124, the transmitting antennas of base station 102 can utilize beamforming to improve signal-to-noise ratio of forward links 118 and 124 for access terminals 116 and 122. Also, while base station 102 utilizes beamforming to transmit to access terminals 116 and 122 scattered randomly through an associated coverage, access terminals in neighboring cells can be subject to less interference as compared to a base station transmitting through a single antenna to all its access terminals.

Conventional approaches oftentimes employ one type of uplink waveform within a wireless communication environment. For instance, Long Term Evolution (LTE) Release 8 utilizes single carrier-frequency division multiple access (SC-FDMA) waveforms on the uplink. Hence, each access terminal in such a traditional system uses an SC-FDMA waveform on the uplink.

Under various scenarios, however, it can be advantageous for access terminals 116, 122 to leverage differing types of waveforms on the uplink. Thus, in contrast to the conventional approaches, techniques set forth herein can support utilization of more than one type of waveform for uplink transmission in system 100. For instance, access terminal 116 can utilize a first type of waveform on the uplink and access terminal 122 can employ a second type of waveform on the uplink, where the first type of waveform can differ from the second type of waveform. Moreover, it is contemplated that access terminals 116, 122 can each respectively employ the same type of waveform for uplink transmission (e.g., while differing type(s) of waveform(s) can be used by disparate access terminal(s) (not shown), for sending uplink transmission(s) to disparate base station(s), during different time periods, under differing conditions, . . . ). Further, the type of waveform respectively used by each access terminal 116, 122 can be statically configured or dynamically changed over time (e.g., respectively by access terminals 116, 122 and/or by base station 102, . . . ).

System 100 can enable each access terminal 116, 122 to specify a type of waveform respectively used thereby for uplink transmission. Thus, since a set of waveform types can be used for uplink transmission in system 100, each access terminal 116, 122 can indicate a particular waveform type from the set actually leveraged for an uplink transmission. Based upon indications respectively obtained from each access terminal 116, 122, base station 102 can detect particular waveform types used by each access terminal 116, 122 (e.g., which can be used for receiving, detecting, decoding, demodulating, etc. the uplink transmission, . . . ).

Figure 2:
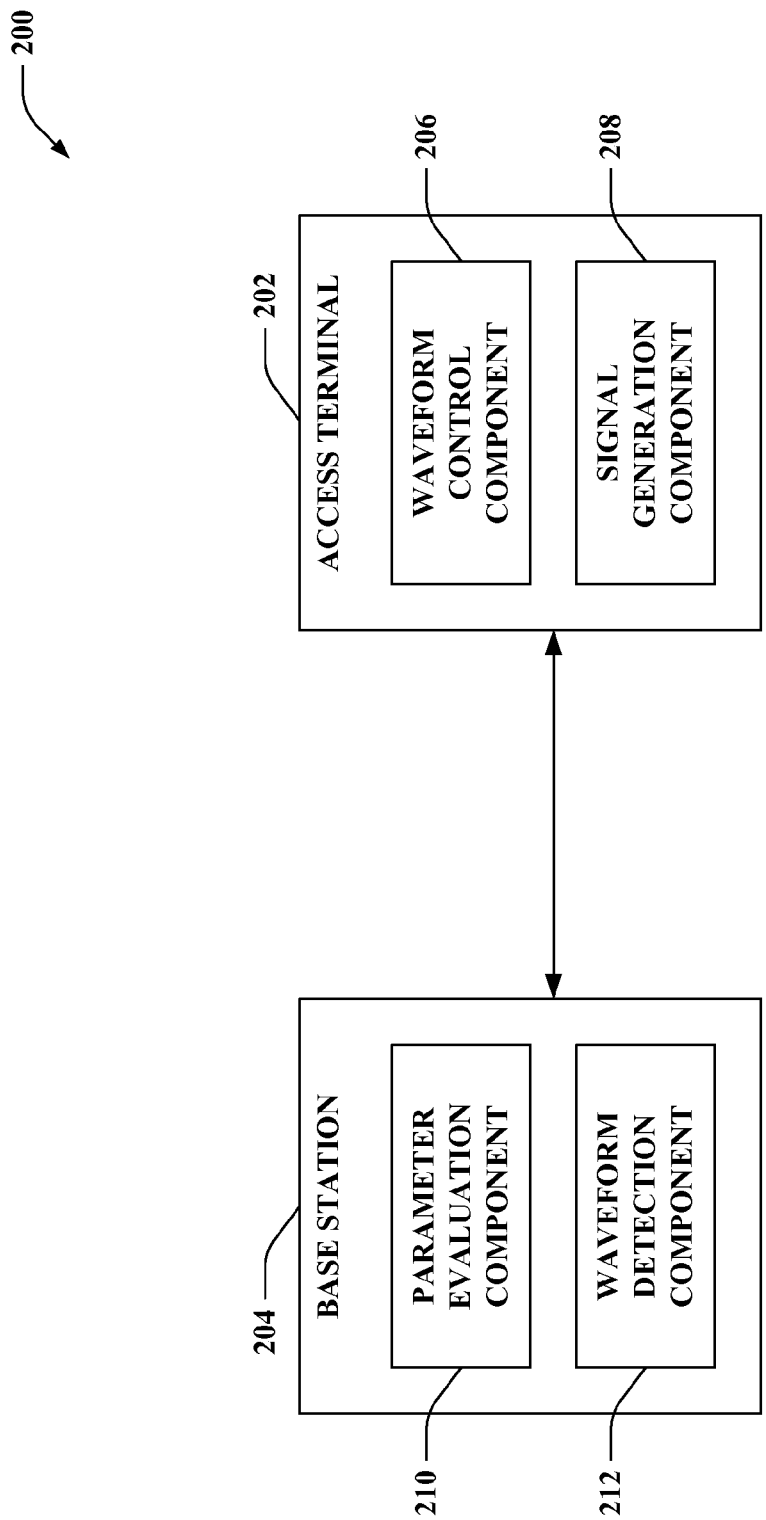
FIG. 2 is an illustration of an example system that signals a type of waveform utilized for an uplink transmission in a wireless communication environment.

Now referring to FIG. 2, illustrated is a system 200 that signals a type of waveform utilized for an uplink transmission in a wireless communication environment. System 200 includes an access terminal 202 that can transmit and/or receive information, signals, data, instructions, commands, bits, symbols, and the like. Access terminal 202 can communicate with a base station 204 via the forward link and/or reverse link. Base station 204 can transmit and/or receive information, signals, data, instructions, commands, bits, symbols, and the like. Although not shown, it is contemplated that system 200 can include any number of access terminals similar to access terminal 202 and/or any number of base stations similar to base station 204. According to an illustration, system 200 can be a Long Term Evolution (LTE) based system, a Long Term Evolution-Advanced (LTE-A) based system, or the like; however, the claimed subject matter is not so limited.

Access terminal 202 can include a waveform control component 206 and a signal generation component 208. Waveform control component 206 can identify a particular type of waveform to be utilized by access terminal 202 for an uplink transmission from access terminal 202 to base station 204. For example, waveform control component 206 can elect the particular type of waveform as a function of an observed metric. Additionally or alternatively, waveform control component 206 can receive a signal from base station 204 (or any other source) that controls the particular type of waveform used by access terminal 202. Moreover, waveform control component 206 can manage a transmitter (not shown), a modulator (not shown), or the like of access terminal 202 to generate a signal with the particular type of waveform. By way of another illustration, waveform control component 206 can include the transmitter and/or the modulator, which can be leveraged to yield the signal with the particular type of waveform. Further, the signal with the particular type of waveform can be transmitted over the uplink to base station 204.

According to an example, various types of waveforms for uplink transmission can be supported by system 200; thus, various types of waveforms can be included in a set of possible waveform types that can be utilized by access terminal 202 for sending an uplink transmission to base station 204 (e.g., during a given period of time, . . . ) as managed by waveform control component 206. The set of possible waveform types can include N possible waveform types, where N can be substantially any integer. For example, a single carrier-frequency division multiple access (SC-FDMA) waveform can be used on the uplink. According to another example, an orthogonal frequency division multiple access (OFDMA) waveform can be utilized on the uplink. Although many of the examples described herein are in the context of using a set of possible waveform types that includes the SC-FDMA waveform or the OFDMA waveform, it is to be contemplated that any other types of waveforms are intended to fall within the scope of the hereto appended claims.

Upon identifying the particular type of waveform to be employed, signal generation component 208 can yield a reference signal that can be sent as part of the uplink transmission to base station 204. More particularly, the reference signal generated by signal generation component 208 can indicate the particular type of waveform being employed by access terminal 202. Thus, signal generation component 208 can output the reference signal as a function of the particular type of waveform utilized for uplink transmission.

The reference signal yielded by signal generation component 208, for instance, can be a demodulation reference signal (DM-RS). Demodulation reference signals can be sent over the uplink to facilitate channel estimation for coherent detection and demodulation at base station 204. Moreover, demodulation reference signals can be generated by signal generation component 208 using Zadoff-Chu sequences.

A Zadoff-Chu sequence is a complex-valued sequence that can be used to yield an electromagnetic signal (e.g., demodulation reference signal, . . . ) of constant amplitude. A Zadoff-Chu sequence can be based upon two parameters: a root sequence (e.g., root index, . . . ) and a cyclic shift. Signals respectively yielded from Zadoff-Chu sequences generated with a common root sequence and different cyclic shifts are orthogonal with each other (e.g., zero correlation between signals generated based upon different cyclic-shifted versions of a common root sequence, . . . ). Moreover, signals respectively generated from Zadoff-Chu sequences yielded from different root sequences can have low cross correlation.

According to various embodiments, signal generation component 208 can yield differing demodulation reference signals as a function of the particular type of waveform used for uplink transmission. For example, to yield the different demodulation references signals, signal generation component 208 can employ different Zadoff-Chu sequences based upon the particular type of waveform. Thus, a first Zadoff-Chu sequence can be used by signal generation component 208 to output a first demodulation reference signal when a first type of waveform (e.g., an SC-FDMA waveform, . . . ) is leveraged by waveform control component 206 for uplink transmission, while a second Zadoff-Chu sequence can be used by signal generation component 208 to output a second demodulation reference signal when a second type of waveform (e.g., an OFDMA waveform, . . . ) is leveraged by waveform control component 206 for uplink transmission. Pursuant to the foregoing, the first Zadoff-Chu sequence can differ from the second Zadoff-Chu sequence.

According to an example, different Zadoff-Chu sequences can be yielded from different cyclic-shifted versions of a common root sequence. Thus, a respective cyclic shift can correspond to each type of waveform (e.g., each disparate type of waveform can be associated with a cyclic shift that differs from cyclic shift(s) associated with the other type(s) of waveform(s), . . . ). Hence, following this example, signal generation component 208 can identify a particular cyclic shift as a function of the type of waveform (e.g., the particular cyclic shift can map to the type of waveform where the mapping can be dynamically determined, statically defined, retained in a look-up table in memory, . . . ), generate and/or select a Zadoff-Chu sequence based upon the identified cyclic shift, and yield a demodulation reference signal using the generated and/or selected Zadoff-Chu sequence. Further, the yielded demodulation reference signal can be sent over the uplink to base station 204.

By way of another example, different Zadoff-Chu sequences can be generated from different root sequences (e.g., different root indexes, . . . ). Following this example, a respective root sequence can correspond to each type of waveform (e.g., each disparate type of waveform can be associated with a root sequence that differs from root sequence(s) associated with the other type(s) of waveform(s), . . . ). Accordingly, signal generation component 208 can recognize a particular root sequence as a function of the type of waveform (e.g., the particular root sequence can map to the type of waveform where the mapping can be dynamically determined, statically defined, retained in a look-up table in memory, . . . ), yield and/or choose a Zadoff-Chu sequence based upon the recognized root sequence, and generate a demodulation reference signal using the yielded and/or chosen Zadoff-Chu sequence. Moreover, the yielded demodulation reference signal can be transmitted over the uplink to base station 204.

Pursuant to another example, signal generation component 208 can generate different demodulation reference signals from a common Zadoff-Chu sequence. More particularly, the same Zadoff-Chu sequence can be used by signal generation component 208 as an input, yet a discrete Fourier transform (DFT)/fast Fourier transform (FFT) operation can selectively be applied to the Zadoff-Chu sequence depending upon waveform type. For instance, the DFT/FFT operation can be effectuated for a first type of waveform, while the DFT/FFT operation can be skipped for a second type of waveform. By way of illustration, signal generation component 208 can implement transform precoding by applying the DFT/FFT operation to the common Zadoff-Chu sequence for the first type of waveform, and thereafter, effectuate operations including an inverse fast Fourier transform (IFFT) operation to yield a demodulation reference signal corresponding to the first type of waveform for transmission to base station 204. In contrast, for the second type of waveform, signal generation component 208 can inhibit applying the DFT/FFT operation to the common Zadoff-Chu sequence; rather, signal generation component 208 can perform operations including the IFFT operation upon the common Zadoff-Chu sequence (e.g., without implementing the DFT/FFT operation on the common Zadoff-Chu sequence, . . . ) to yield a demodulation reference signal corresponding to the second type of waveform for transmission to base station 204.

According to other embodiments, signal generation component 208 can yield a substantially similar demodulation reference signal regardless of waveform type, yet can transmit the demodulation reference signal in different symbol locations, tone locations, or a combination thereof as a function of the waveform type. For example, one symbol included in each slot (e.g., each 0.5 ms slot, . . . ) of a Physical Uplink Shared Channel (PUSCH) can carry a demodulation reference signal. According to another example, two or three symbols included in each slot (e.g., each 0.5 ms slot, . . . ) of a Physical Uplink Control Channel (PUCCH) can carry a demodulation reference signal depending upon PUCCH format and cyclic prefix length. Thus, for instance, signal generation component 208 can select symbol location(s) (e.g., within each slot, . . . ) for carrying the demodulation reference signal based upon the waveform type, and can transmit the demodulation reference signal at the selected symbol location(s). By way of another example, signal generation component 208 can select tone location(s) (e.g., subcarrier(s), . . . ) for carrying the demodulation reference signal based upon the waveform type, and can transmit the demodulation reference signal at the selected tone location(s). Following this example, if two resource blocks (RBs) (e.g., each including 24 tones/subcarriers, . . . ) are assigned to access terminal 202 for uplink transmission, then subcarriers from a first resource block can be used by signal generation component 208 for transmitting the demodulation reference signal when a first type of waveform is employed and subcarriers from a second resource block can be used by signal generation component 208 for transmitting the demodulation reference signal when a second type of waveform is employed. However, it is to be appreciated that the claimed subject matter is not so limited.

Base station 204 can receive the uplink transmission from access terminal 202 and can efficiently identify the type of waveform utilized for the uplink transmission. Accordingly, base station 204 can detect, decode, demodulate, etc. the uplink transmission based upon the identified type of waveform. To effectuate the foregoing, base station 204 can include a parameter evaluation component 210 and a waveform detection component 212.

Parameter evaluation component 210 can recognize a parameter associated with a demodulation reference signal received from access terminal 202 via the uplink. For example, the parameter identified by parameter evaluation component 210 can be an identity of a particular sequence (e.g., Zadoff-Chu sequence, . . . ) associated with the received demodulation reference signal. The identity of the particular sequence can be analyzed by parameter evaluation component 210 based upon energy detection after correlation with a local copy of an assumed sequence. For instance, the particular sequence can be recognized from a set of possible sequences, which can each differ based upon cyclic shift, root index, and/or use of the DFT/FFT operation prior to performance of the IFFT operation. Thus, parameter evaluation component 210 can discern a particular cyclic shift and/or a particular root index of a Zadoff-Chu sequence associated with the received demodulation reference signal. Further, parameter evaluation component 210 can evaluate the received demodulation reference signal to detect whether the DFT/FFT operation was applied to the Zadoff-Chu sequence prior to application of the IFFT operation. According to another example, the parameter recognized by parameter evaluation component 210 can be symbol location(s) and/or tone location(s) at which the demodulation reference signal is carried. Further, it is contemplated that a combination of the foregoing example parameters can be analyzed by parameter evaluation component 210.

Further, based upon the parameter(s) identified by parameter evaluation component 210, waveform detection component 212 can detect a type of waveform utilized by access terminal 202 on the uplink. For instance, the type of waveform can map to one or more of the parameters detected by parameter evaluation component 210. Moreover, the relationship between the parameter(s) and the type of waveform can be dynamically determined, statically defined, or the like. For instance, a mapping between the parameter(s) and the type of waveform can be retained in a look-up table in memory (e.g., of base station 204, . . . ); however, the claimed subject matter is not so limited.

Figure 3:
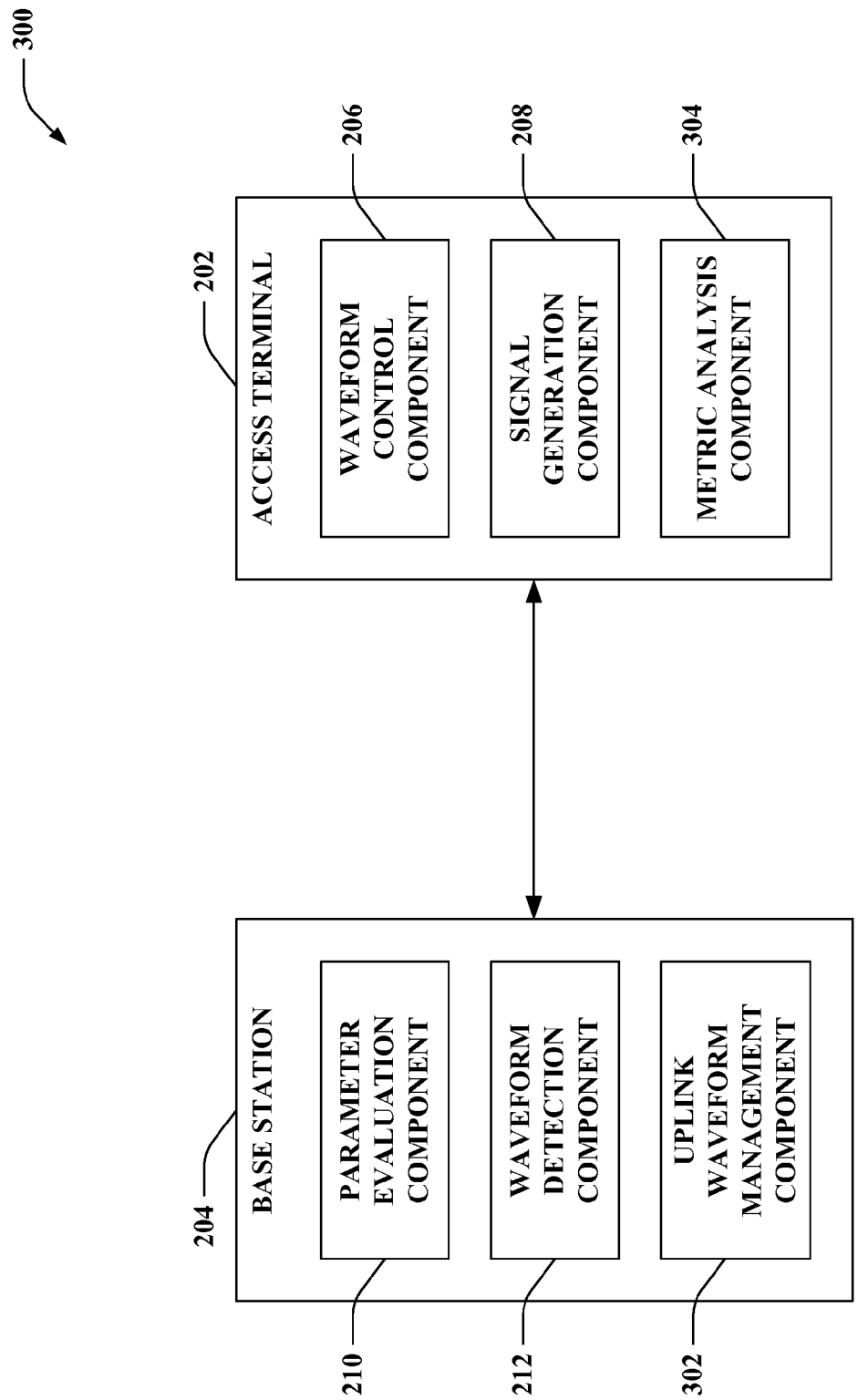
FIG. 3 is an illustration of an example system that manages a type of waveform utilized for uplink transmission in a wireless communication environment.

Now turning to FIG. 3, illustrated is a system 300 that manages a type of waveform utilized for uplink transmission in a wireless communication environment. System 300 includes access terminal 202 and base station 204. As described herein, access terminal 202 can include waveform control component 206 that can manage generating an uplink transmission with a particular type of waveform and signal generation component 208 that can indicate the particular type of waveform employed by access terminal 202 via a demodulation reference signal sent over the uplink to base station 204. Moreover, base station 204 can discern the particular type of waveform utilized by access terminal 202 for uplink transmission from the demodulation reference signal by leveraging parameter evaluation component 210 and waveform detection component 212.

Base station 204 can further include an uplink waveform management component 302 that can signal information identifying a base station selected type of waveform to be utilized by access terminal 202 for uplink transmission. For instance, the information carried by the signal yielded by uplink waveform management component 302 sent to access terminal 202 can cause waveform control component 206 to use the base station selected type of waveform identified by the information as the particular type of waveform (e.g., actually utilized by waveform control component 206 for uplink transmission, . . . ). According to an example, uplink waveform management component 302 can use a downlink control channel to signal the information identifying the base station selected type of waveform. Following this example, a layer 1 control signal that carries the information identifying the base station selected type of waveform can be sent over a Physical Downlink Control Channel (PDCCH), which can enable dynamically switching between waveform types (e.g., switch between waveform types per subframe, . . . ); however, the claimed subject matter is not so limited. Pursuant to another example, uplink waveform management component 302 can use layer 3 signaling (e.g., Radio Resource Control (RRC) signaling, . . . ) to signal the information identifying the base station selected type of waveform. According to this example, RRC signaling can enable assigning a waveform type statically for a period of time (e.g., 100 ms, . . . ); yet, the claimed subject matter is not so limited. By way of another example, a default type of waveform can be included in system information (e.g., as controlled by uplink waveform management component 302, . . . ), which can indicate the default waveform type to be utilized by access terminal(s) when sending uplink transmission(s) to base station 204. The default waveform type can thereafter be altered (e.g., by uplink waveform management component 302, access terminal 202, . . . ). In accordance with another example, it is contemplated that base station 204 need not indicate the base station selected type of waveform and/or the default type of waveform, and rather, access terminal 202 can select the particular type of waveform.

Moreover, access terminal 202 can further include a metric analysis component 304 that can select the particular type of waveform to be utilized by access terminal 202 (e.g., as managed by waveform control component 206, . . . ). Metric analysis component 304 can choose the particular type of waveform based upon one or more metrics. For example, metric analysis component 304 can evaluate a signal to noise ratio (SNR), a cubic metric, power headroom, geometry, transmission mode, a combination thereof, or any other metric, and can choose the particular type of waveform based upon the evaluation.

Further, metric analysis component 304 (or waveform control component 206) can override signaling from base station 204 (e.g., yielded by uplink waveform management component 302, . . . ) by choosing the particular type of waveform to use on the uplink (e.g., the particular type of waveform can match or differ from the base station selected type of waveform signaled by base station 204, the particular type of waveform can match or differ from the default type of waveform indicated in system information, . . . ). By way of illustration, uplink waveform management component 302 can signal information that indicates that access terminal 202 should utilize SC-FDMA on the uplink. However, metric analysis component 304 can override the signaled information from base station 204 based upon evaluation of one or more metrics and instead cause waveform control component 206 to employ OFDMA on the uplink. Yet, it is to be appreciated that the claimed subject matter is not limited to the foregoing illustration.

Figure 4:
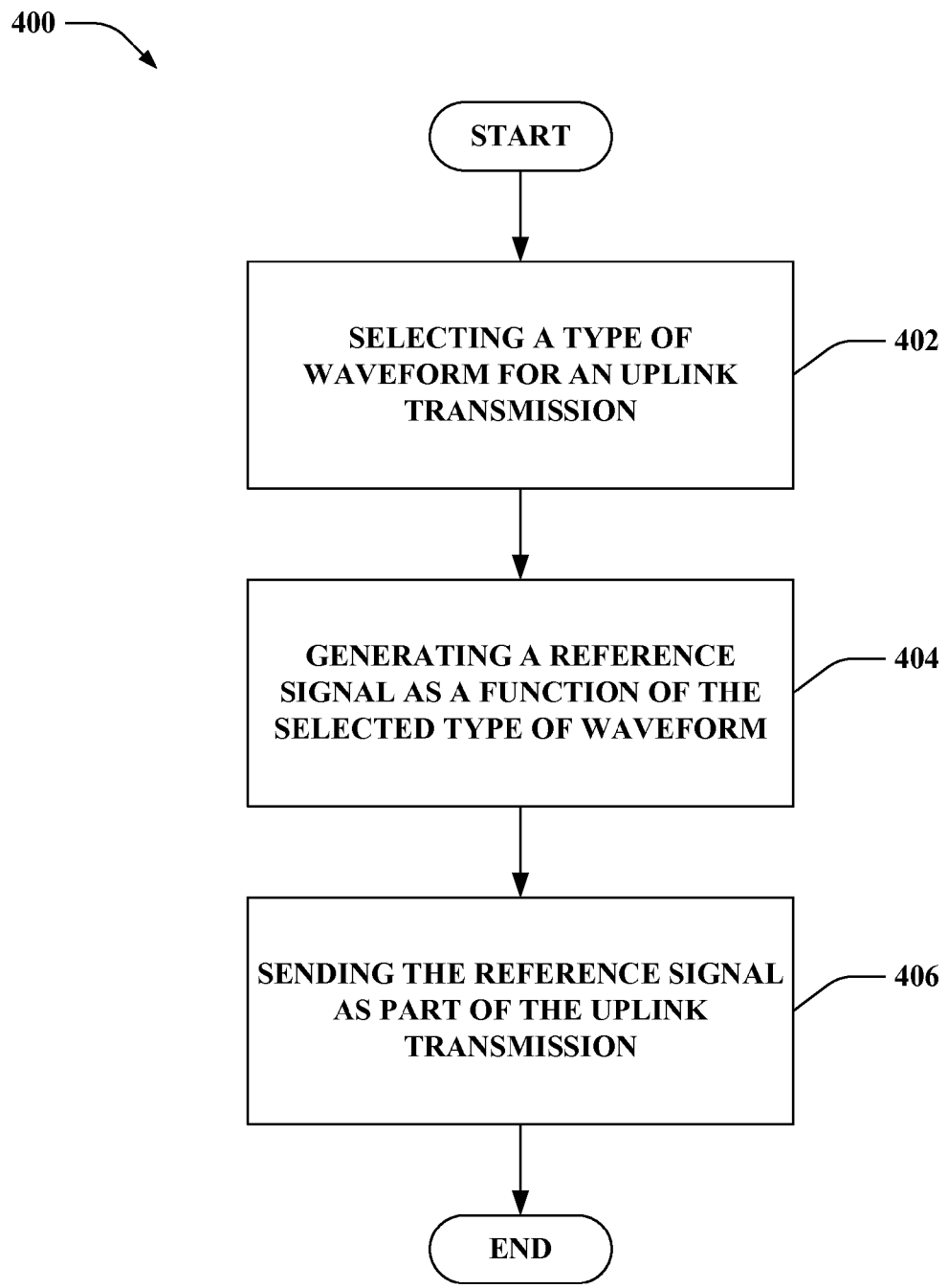
FIG. 4 is an illustration of an example methodology that facilitates identifying employed waveform type in a wireless communication environment.
Figure 5:
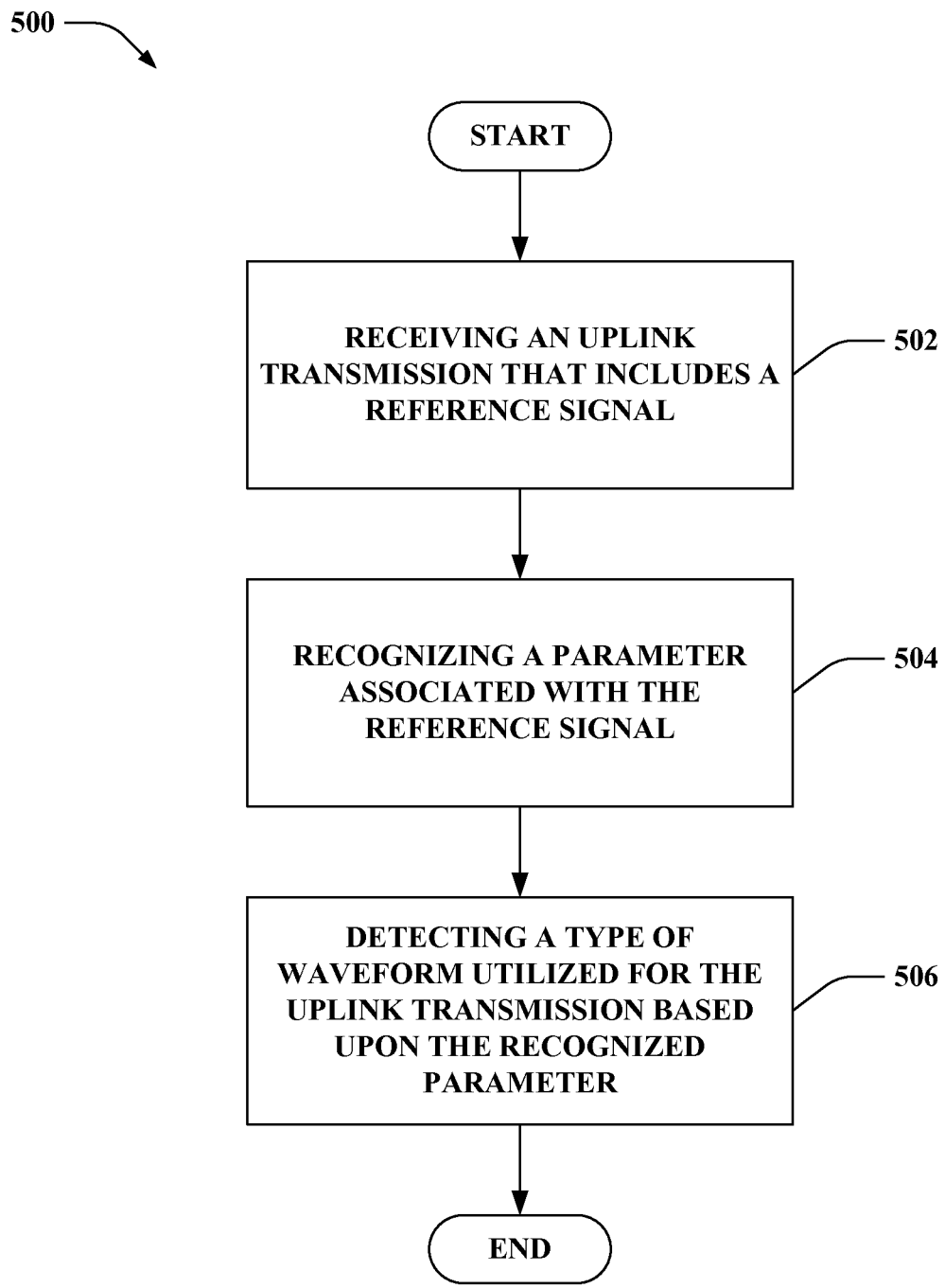
FIG. 5 is an illustration of an example methodology that facilitates recognizing utilized waveform type in a wireless communication environment.

Referring to FIGS. 4-5, methodologies relating to indicating a type of waveform utilized for an uplink transmission in a wireless communication environment are illustrated. While, for purposes of simplicity of explanation, the methodologies are shown and described as a series of acts, it is to be understood and appreciated that the methodologies are not limited by the order of acts, as some acts can, in accordance with one or more embodiments, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts can be required to implement a methodology in accordance with one or more embodiments.

With reference to FIG. 4, illustrated is a methodology 400 that facilitates identifying employed waveform type in a wireless communication environment. At 402, a type of waveform for an uplink transmission (e.g., to a base station, . . . ) can be selected. The type of waveform can be selected from a set of possible waveform types. According to an example, the set of possible waveform types can include a single carrier-frequency division multiple access (SC-FDMA) waveform and an orthogonal frequency division multiple access (OFDMA); however, it is contemplated that any other type of waveform can be included in the set. Further, the type of waveform can be selected in response to a received signal (e.g., from a base station, layer 1 control signal, layer 3 signal, . . . ). Moreover, the received signal can be overridden by an access terminal that yields the uplink transmission. By way of further example, the waveform can be selected based upon a metric such as, for instance, a signal to noise ratio (SNR), a cubic metric, power headroom, geometry, transmission mode, a combination thereof, or any other metric.

At 404, a reference signal can be generated as a function of the selected type of waveform. The reference signal can be a demodulation reference signal yielded from a Zadoff-Chu sequence. Pursuant to various embodiments, the Zadoff-Chu sequence used for the demodulation reference signal can be a function of the selected type of waveform. For example, a cyclic shift from a set of possible, differing cyclic shifts can be chosen for the Zadoff-Chu sequence, where the chosen cyclic shift corresponds to the selected type of waveform. According to another example, a root index from a set of possible, differing root indexes can be elected for the Zadoff-Chu sequence, where the elected root index corresponds to the selected type of waveform. Pursuant to another example, whether a discrete Fourier transform (DFT)/fast Fourier transform (FFT) operation is applied to the demodulation reference signal prior to implementing an inverse fast Fourier transform (IFFT) operation upon the demodulation reference signal can be controlled as a function of the selected type of waveform. According to other embodiments, a symbol location, a tone location, or a combination thereof for the demodulation reference signal can be managed a function of the selected type of waveform. At 406, the reference signal (e.g., demodulation reference signal, . . . ) can be sent as part of the uplink transmission (e.g., to the base station, . . . ). Hence, the reference signal can identify the type of waveform utilized for the uplink transmission.

Now turning to FIG. 5, illustrated is a methodology 500 that facilitates recognizing utilized waveform type in a wireless communication environment. At 502, an uplink transmission that includes a reference signal can be received (e.g., from an access terminal, . . . ). The reference signal, for instance, can be a demodulation reference signal. According to an illustration, a signal (e.g., layer 1 signal, layer 3 signal, . . . ) can be sent indicating a base station selected type of waveform to be used for the uplink transmission. At 504, a parameter associated with the reference signal can be recognized. For example, the parameter can be an identity of a Zadoff-Chu sequence associated with the reference signal. The identity of the Zadoff-Chu sequence can be evaluated based upon energy detection after correlation with a local copy of an assumed Zadoff-Chu sequence. By way of illustration, a cyclic shift and/or a root index associated with the Zadoff-Chu sequence can be detected. According to a further illustration, whether a DFT/FFT operation was applied to the Zadoff-Chu sequence prior to application of an IFFT operation can be analyzed. Pursuant to another example, the parameter can be a symbol location, tone location, or a combination thereof at which the demodulation reference signal is carried. At 506, a type of waveform utilized for the uplink transmission can be detected based upon the recognized parameter. For instance, the type of waveform can map to the recognized parameter. The detected type of waveform can thereafter be leveraged to decode, demodulation, etc. the uplink transmission, for example.

It will be appreciated that, in accordance with one or more aspects described herein, inferences can be made regarding indicating a type of waveform employed on an uplink in a wireless communication environment. As used herein, the term to "infer" or "inference" refers generally to the process of reasoning about or inferring states of the system, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Figure 6:
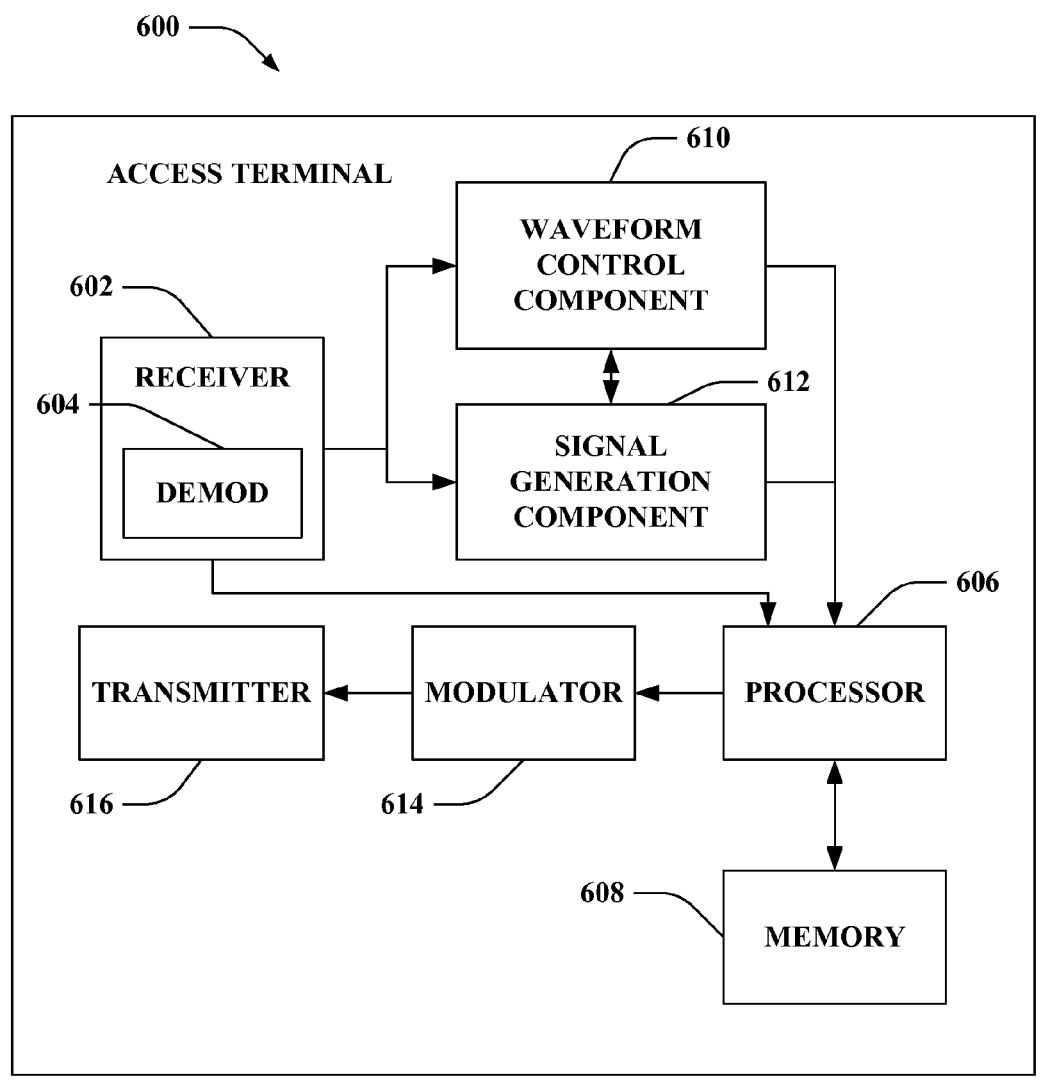
FIG. 6 is an illustration of an example access terminal that indicates a type of waveform utilized on an uplink in a wireless communication system.

FIG. 6 is an illustration of an access terminal 600 that indicates a type of waveform utilized on an uplink in a wireless communication system. Access terminal 600 comprises a receiver 602 that receives a signal from, for instance, a receive antenna (not shown), and performs typical actions thereon (e.g., filters, amplifies, downconverts, etc.) the received signal and digitizes the conditioned signal to obtain samples. Receiver 602 can be, for example, an MMSE receiver, and can comprise a demodulator 604 that can demodulate received symbols and provide them to a processor 606 for channel estimation. Processor 606 can be a processor dedicated to analyzing information received by receiver 602 and/or generating information for transmission by a transmitter 616, a processor that controls one or more components of access terminal 600, and/or a processor that both analyzes information received by receiver 602, generates information for transmission by transmitter 616, and controls one or more components of access terminal 600.

Access terminal 600 can additionally comprise memory 608 that is operatively coupled to processor 606 and that can store data to be transmitted, received data, and any other suitable information related to performing the various actions and functions set forth herein. Memory 608, for instance, can store protocols and/or algorithms associated with choosing a type of waveform to employ for uplink transmission, generating a reference signal that identifies the chosen type of waveform employed for uplink transmission, and the like.

It will be appreciated that the data store (e.g., memory 608) described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable PROM (EEPROM), or flash memory. Volatile memory can include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). The memory 608 of the subject systems and methods is intended to comprise, without being limited to, these and any other suitable types of memory.

Processor 606 can be operatively coupled to a waveform control component 610 and/or a signal generation component 612. Waveform control component 610 can be substantially similar to waveform control component 206 of FIG. 2 and/or signal generation component 612 can be substantially similar to signal generation component 208 of FIG. 2. Waveform control component 610 can select a type of waveform to be utilized for uplink transmission. Moreover, signal generation component 612 can yield a reference signal (e.g., demodulation reference signal, ... ) based upon the selected type of waveform. Hence, the reference signal can identify the selected type of waveform. Although not shown, it is to be appreciated that access terminal 600 can further include a metric analysis component, which can be substantially similar to metric analysis component 304 of FIG. 3. Access terminal 600 still further comprises a modulator 614 and a transmitter 616 that transmits data, signals, etc. to a base station. Although depicted as being separate from the processor 606, it is to be appreciated that waveform control component 610, signal generation component 612 and/or modulator 614 can be part of processor 606 or a number of processors (not shown).

Figure 7:
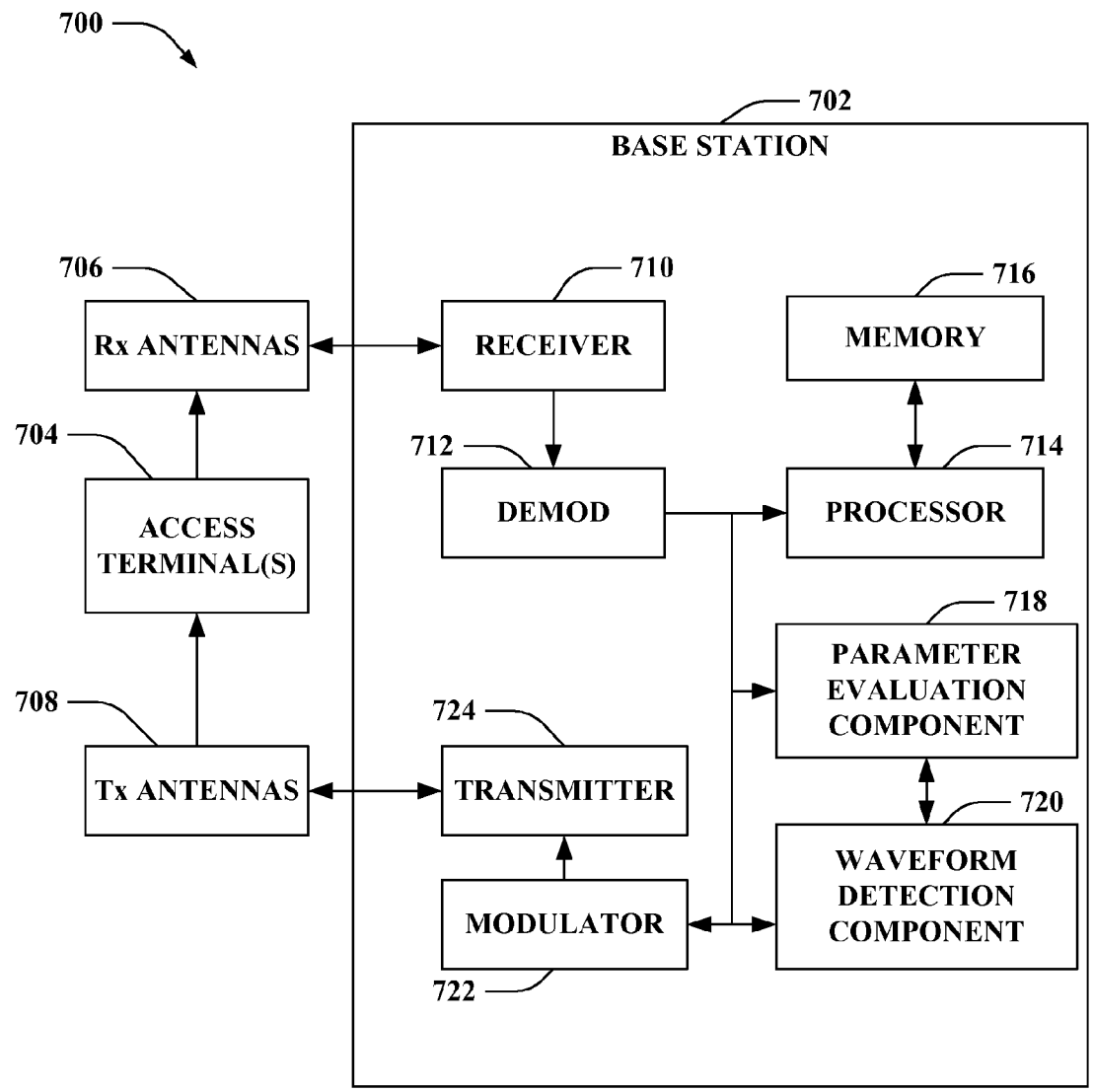
FIG. 7 is an illustration of an example system that identifies a type of waveform utilized on an uplink in a wireless communication environment.

FIG. 7 is an illustration of a system 700 that identifies a type of waveform utilized on an uplink in a wireless communication environment. System 700 comprises a base station 702 (e.g., access point, ... ) with a receiver 710 that receives signal(s) from one or more access terminals 704 through a plurality of receive antennas 706, and a transmitter 724 that transmits to the one or more access terminals 704 through a transmit antenna 708. Receiver 710 can receive information from receive antennas 706 and is operatively associated with a demodulator 712 that demodulates received information. Demodulated symbols are analyzed by a processor 714 that can be similar to the processor described above with regard to FIG. 6, and which is coupled to a memory 716 that stores data to be transmitted to or received from access terminal(s) 704 and/or any other suitable information related to performing the various actions and functions set forth herein. Processor 714 is further coupled to a parameter evaluation component 718 and/or a waveform detection component 720. Parameter evaluation component 718 can be substantially similar to parameter evaluation component 210 of FIG. 2 and/or waveform detection component 720 can be substantially similar to waveform detection component 212 of FIG. 2. Parameter evaluation component 718 can recognize one or more parameters associated with a reference signal received as part of an uplink transmission. Further, waveform detection component 720 can decipher a type of waveform corresponding to the uplink transmission based upon the recognized one or more parameters. Moreover, although not shown, it is contemplated that base station 702 can further include an uplink waveform management component, which can be substantially similar to uplink waveform management component 302 of FIG. 3. Base station 702 can further include a modulator 722. Modulator 722 can multiplex a frame for transmission by a transmitter 724 through antennas 708 to access terminal(s) 704 in accordance with the aforementioned description. Although depicted as being separate from the processor 714, it is to be appreciated that parameter evaluation component 718, waveform detection component 720, and/or modulator 722 can be part of processor 714 or a number of processors (not shown).

Figure 8:
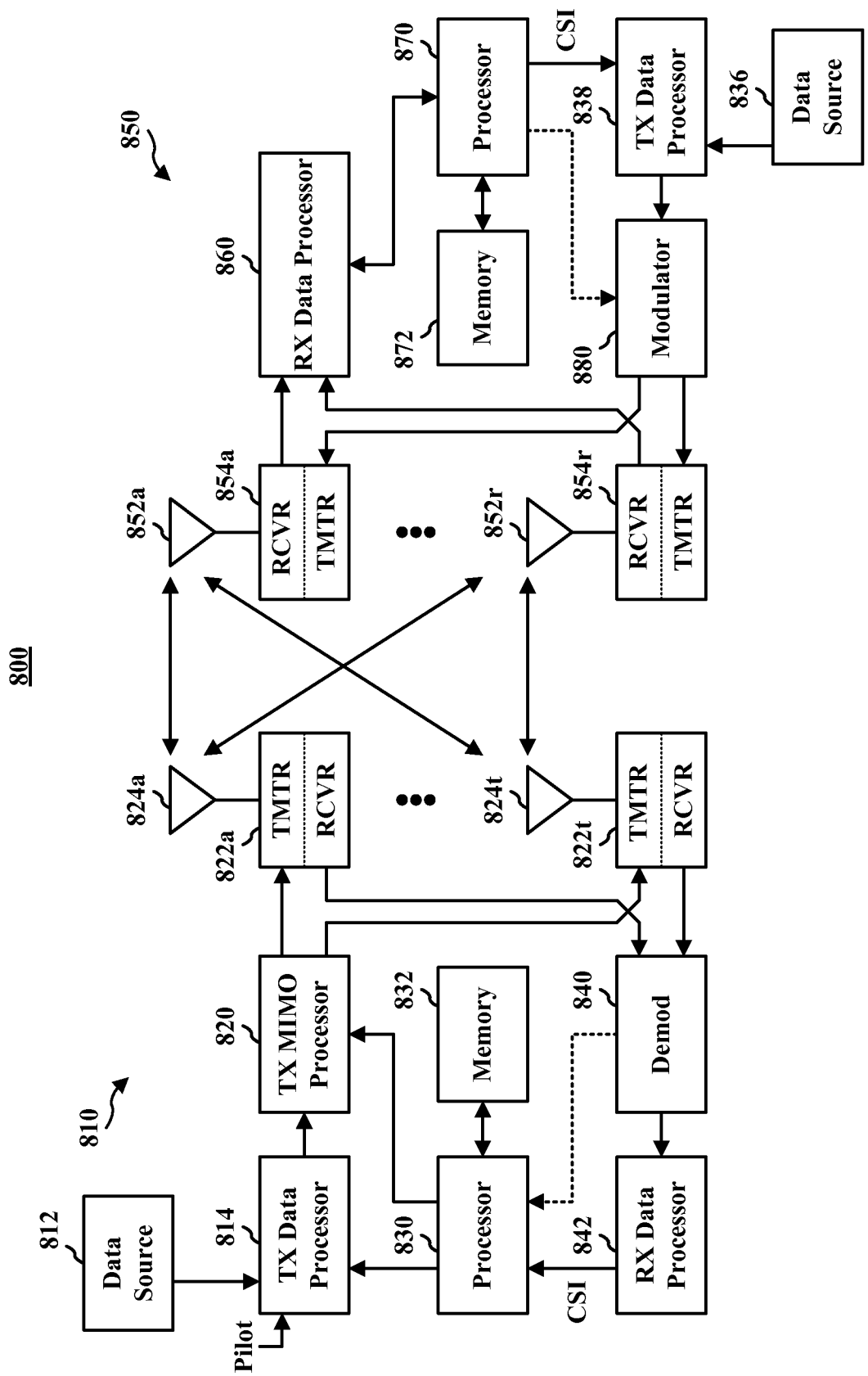
FIG. 8 is an illustration of an example wireless network environment that can be employed in conjunction with the various systems and methods described herein.

FIG. 8 shows an example wireless communication system 800. The wireless communication system 800 depicts one base station 810 and one access terminal 850 for sake of brevity. However, it is to be appreciated that system 800 can include more than one base station and/or more than one access terminal, wherein additional base stations and/or access terminals can be substantially similar or different from example base station 810 and access terminal 850 described below. In addition, it is to be appreciated that base station 810 and/or access terminal 850 can employ the systems (FIGS. 1-3, 6-7, and 9-10) and/or methods (FIGS. 4-5) described herein to facilitate wireless communication there between.

At base station 810, traffic data for a number of data streams is provided from a data source 812 to a transmit (TX) data processor 814. According to an example, each data stream can be transmitted over a respective antenna. TX data processor 814 formats, codes, and interleaves the traffic data stream based on a particular coding scheme selected for that data stream to provide coded data.

The coded data for each data stream can be multiplexed with pilot data using orthogonal frequency division multiplexing (OFDM) techniques. Additionally or alternatively, the pilot symbols can be frequency division multiplexed (FDM), time division multiplexed (TDM), or code division multiplexed (CDM). The pilot data is typically a known data pattern that is processed in a known manner and can be used at access terminal 850 to estimate channel response. The multiplexed pilot and coded data for each data stream can be modulated (e.g., symbol mapped) based on a particular modulation scheme (e.g., binary phase-shift keying (BPSK), quadrature phase-shift keying (QPSK), M-phase-shift keying (M-PSK), M-quadrature amplitude modulation (M-QAM), etc.) selected for that data stream to provide modulation symbols. The data rate, coding, and modulation for each data stream can be determined by instructions performed or provided by processor 830.

The modulation symbols for the data streams can be provided to a TX MIMO processor 820, which can further process the modulation symbols (e.g., for OFDM). TX MIMO processor 820 then provides $N_T$ modulation symbol streams to $N_T$ transmitters (TMTR) 822a through 822t. In various embodiments, TX MIMO processor 820 applies beamforming weights to the symbols of the data streams and to the antenna from which the symbol is being transmitted. Each transmitter 822 receives and processes a respective symbol stream to provide one or more analog signals, and further conditions (e.g., amplifies, filters, and upconverts) the analog signals to provide a modulated signal suitable for transmission over the MIMO channel. Further, $N_T$ modulated signals from transmitters 822a through 822t are transmitted from $N_T$ antennas 824a through 824t, respectively.

At access terminal 850, the transmitted modulated signals are received by $N_R$ antennas 852a through 852r and the received signal from each antenna 852 is provided to a respective receiver (RCVR) 854a through 854r. Each receiver 854 conditions (e.g., filters, amplifies, and downconverts) a respective signal, digitizes the conditioned signal to provide samples, and further processes the samples to provide a corresponding "received" symbol stream.

An RX data processor 860 can receive and process the $N_R$ received symbol streams from $N_R$ receivers 854 based on a particular receiver processing technique to provide $N_T$ "detected" symbol streams. RX data processor 860 can demodulate, deinterleave, and decode each detected symbol stream to recover the traffic data for the data stream. The processing by RX data processor 860 is complementary to that performed by TX MIMO processor 820 and TX data processor 814 at base station 810.

A processor 870 can periodically determine which available technology to utilize as discussed above. Further, processor 870 can formulate a reverse link message comprising a matrix index portion and a rank value portion.

The reverse link message can comprise various types of information regarding the communication link and/or the received data stream. The reverse link message can be processed by a TX data processor 838, which also receives traffic data for a number of data streams from a data source 836, modulated by a modulator 880, conditioned by transmitters 854a through 854r, and transmitted back to base station 810.

At base station 810, the modulated signals from access terminal 850 are received by antennas 824, conditioned by receivers 822, demodulated by a demodulator 840, and processed by a RX data processor 842 to extract the reverse link message transmitted by access terminal 850. Further, processor 830 can process the extracted message to determine which precoding matrix to use for determining the beamforming weights.

Processors 830 and 870 can direct (e.g., control, coordinate, manage, etc.) operation at base station 810 and access terminal 850, respectively. Respective processors 830 and 870 can be associated with memory 832 and 872 that store program codes and data. Processors 830 and 870 can also perform computations to derive frequency and impulse response estimates for the uplink and downlink, respectively.

In an aspect, logical channels are classified into Control Channels and Traffic Channels. Logical Control Channels can include a Broadcast Control Channel (BCCH), which is a DL channel for broadcasting system control information. Further, Logical Control Channels can include a Paging Control Channel (PCCH), which is a DL channel that transfers paging information. Moreover, the Logical Control Channels can comprise a Multicast Control Channel (MCCH), which is a Point-to-multipoint DL channel used for transmitting Multimedia Broadcast and Multicast Service (MBMS) scheduling and control information for one or several MTCHs. Generally, after establishing a Radio Resource Control (RRC) connection, this channel is only used by UEs that receive MBMS (e.g., old MCCH+MSCH). Additionally, the Logical Control Channels can include a Dedicated Control Channel (DCCH), which is a Point-to-point bi-directional channel that transmits dedicated control information and can be used by UEs having a RRC connection. In an aspect, the Logical Traffic Channels can comprise a Dedicated Traffic Channel (DTCH), which is a Point-to-point bi-directional channel dedicated to one UE for the transfer of user information. Also, the Logical Traffic Channels can include a Multicast Traffic Channel (MTCH) for Point-to-multipoint DL channel for transmitting traffic data.

In an aspect, Transport Channels are classified into DL and UL. DL Transport Channels comprise a Broadcast Channel (BCH), a Downlink Shared Data Channel (DL-SDCH) and a Paging Channel (PCH). The PCH can support UE power saving (e.g., Discontinuous Reception (DRX) cycle can be indicated by the network to the UE, . . . ) by being broadcasted over an entire cell and being mapped to Physical layer (PHY) resources that can be used for other control/traffic channels. The UL Transport Channels can comprise a Random Access Channel (RACH), a Request Channel (REQCH), a Uplink Shared Data Channel (UL-SDCH) and a plurality of PHY channels.

The PHY channels can include a set of DL channels and UL channels. For example, the DL PHY channels can include: Common Pilot Channel (CPICH); Synchronization Channel (SCH); Common Control Channel (CCCH); Shared DL Control Channel (SDCCH); Multicast Control Channel (MCCH); Shared UL Assignment Channel (SUACH); Acknowledgement Channel (ACKCH); DL Physical Shared Data Channel (DL-PSDCH); UL Power Control Channel (UPCCH); Paging Indicator Channel (PICH); and/or Load Indicator Channel (LICH). By way of further illustration, the UL PHY Channels can include: Physical Random Access Channel (PRACH); Channel Quality Indicator Channel (CQICH); Acknowledgement Channel (ACKCH); Antenna Subset Indicator Channel (ASICH); Shared Request Channel (SREQCH); UL Physical Shared Data Channel (UL-PSDCH); and/or Broadband Pilot Channel (BPICH).

It is to be understood that the embodiments described herein can be implemented in hardware, software, firmware, middleware, microcode, or any combination thereof. For a hardware implementation, the processing units can be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof.

When the embodiments are implemented in software, firmware, middleware or microcode, program code or code segments, they can be stored in a machine-readable medium, such as a storage component. A code segment can represent a procedure, a function, a subprogram, a program, a routine, a subroutine, a module, a software package, a class, or any combination of instructions, data structures, or program statements. A code segment can be coupled to another code segment or a hardware circuit by passing and/or receiving information, data, arguments, parameters, or memory contents. Information, arguments, parameters, data, etc. can be passed, forwarded, or transmitted using any suitable means including memory sharing, message passing, token passing, network transmission, etc.

For a software implementation, the techniques described herein can be implemented with modules (e.g., procedures, functions, and so on) that perform the functions described herein. The software codes can be stored in memory units and executed by processors. The memory unit can be implemented within the processor or external to the processor, in which case it can be communicatively coupled to the processor via various means as is known in the art.

Figure 9:
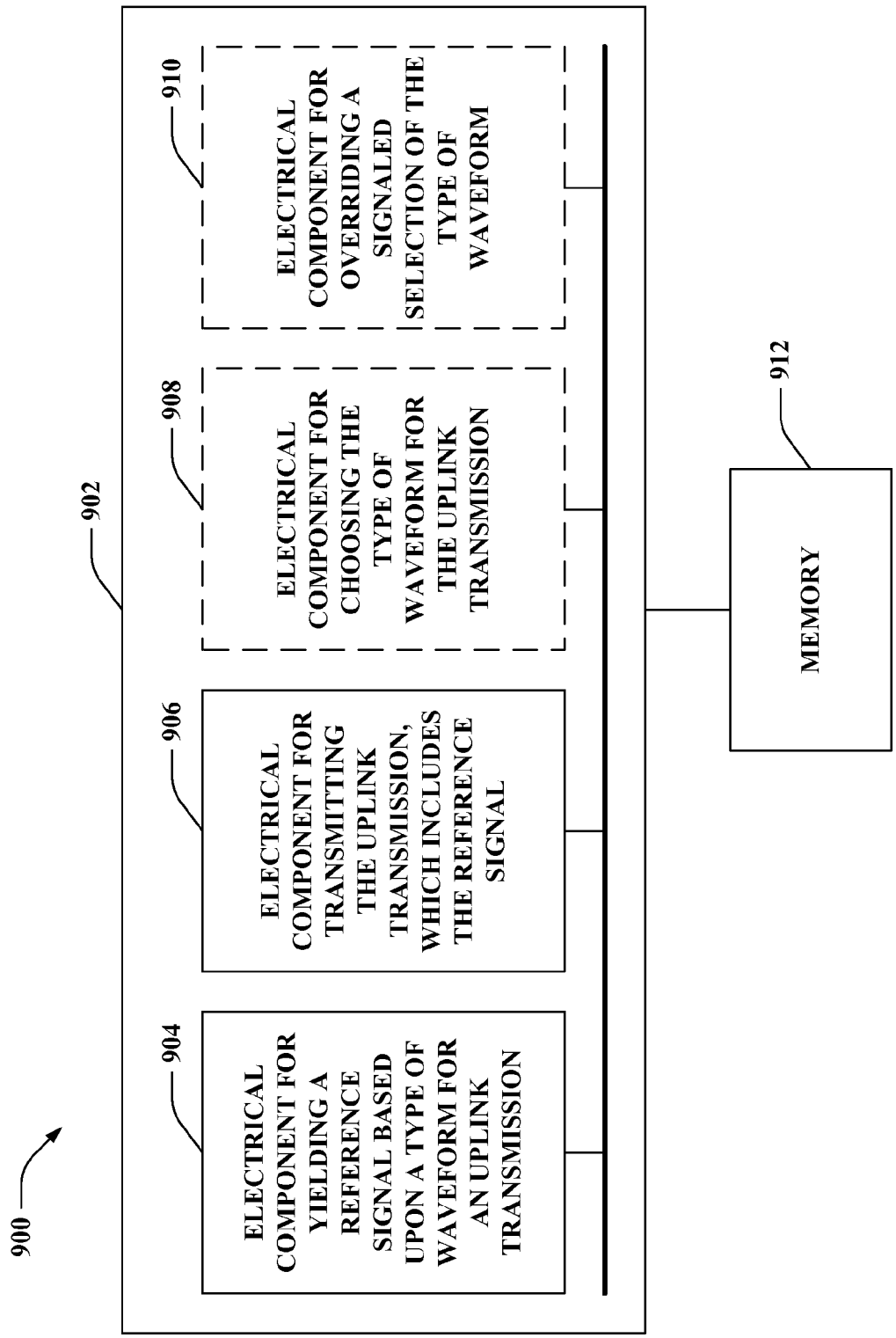
FIG. 9 is an illustration of an example system that enables indicating employed waveform type in a wireless communication environment.

With reference to FIG. 9, illustrated is a system 900 that enables indicating employed waveform type in a wireless communication environment. For example, system 900 can reside within an access terminal. It is to be appreciated that system 900 is represented as including functional blocks, which can be functional blocks that represent functions implemented by a processor, software, or combination thereof (e.g., firmware). System 900 includes a logical grouping 902 of electrical components that can act in conjunction. For instance, logical grouping 902 can include an electrical component for yielding a reference signal based upon a type of waveform for an uplink transmission 904. Moreover, logical grouping 902 can include an electrical component for transmitting the uplink transmission, which includes the reference signal 906. Further, logical grouping 902 can optionally include an electrical component for choosing the type of waveform for the uplink transmission 908. Logical grouping 902 can also optionally include an electrical component for overriding a signaled selection of the type of waveform 910. Additionally, system 900 can include a memory 912 that retains instructions for executing functions associated with electrical components 904, 906, 908, and 910. While shown as being external to memory 912, it is to be understood that one or more of electrical components 904, 906, 908, and 910 can exist within memory 912.

Figure 10:
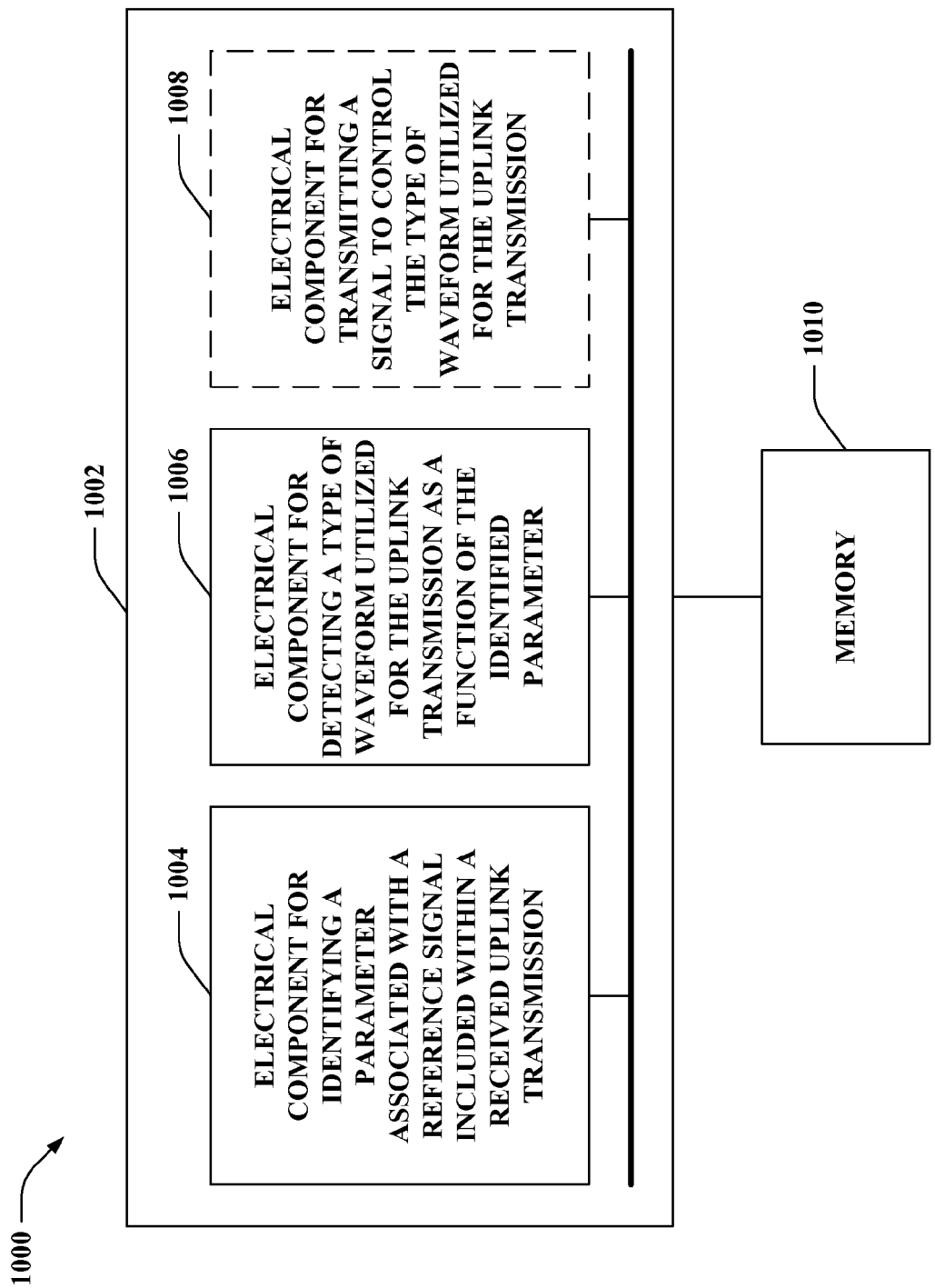
FIG. 10 is an illustration of an example system that enables recognizing utilized waveform type in a wireless communication environment.

With reference to FIG. 10, illustrated is a system 1000 that enables recognizing utilized waveform type in a wireless communication environment. For example, system 1000 can reside at least partially within a base station. It is to be appreciated that system 1000 is represented as including functional blocks, which can be functional blocks that represent functions implemented by a processor, software, or combination thereof (e.g., firmware). System 1000 includes a logical grouping 1002 of electrical components that can act in conjunction. For instance, logical grouping 1002 can include an electrical component for identifying a parameter associated with a reference signal included within a received uplink transmission 1004. Moreover, logical grouping 1002 can include an electrical component for detecting a type of waveform utilized for the uplink transmission as a function of the identified parameter 1006. Further, logical grouping 1002 can optionally include an electrical component for transmitting a signal to control the type of waveform utilized for the uplink transmission 1008. Additionally, system 1000 can include a memory 1010 that retains instructions for executing functions associated with electrical components 1004, 1006, and 1008. While shown as being external to memory 1010, it is to be understood that one or more of electrical components 1004, 1006, and 1008 can exist within memory 1010.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method that facilitates recognizing utilized waveform type in a wireless communication environment, comprising:
receiving an uplink transmission that includes a reference signal;
recognizing a parameter associated with the received reference signal; and
detecting whether a single carrier-frequency division multiple access (SC-FDMA) waveform or an orthogonal frequency division multiple access (OFDMA) waveform is utilized for the uplink transmission based on the recognized parameter, and wherein the SC-FDMA waveform utilizes single carrier modulation and frequency domain equalization.

2. The method of claim 1, wherein the reference signal is a demodulation reference signal.

3. The method of claim 1, further comprising transmitting a signal indicating a base station selected type of waveform to be used for the uplink transmission.

4. The method of claim 1, wherein the parameter is an identity of a Zadoff-Chu sequence associated with the reference signal.

5. The method of claim 4, further comprising evaluating the identity of the Zadoff-Chu sequence based upon energy detection after correlation with a local copy of an assumed Zadoff-Chu sequence.

6. The method of claim 5, evaluating the identity of the Zadoff-Chu sequence further comprises detecting at least one of a cyclic shift of the Zadoff-Chu sequence, a root index of the Zadoff-Chu sequence, or whether a discrete Fourier transform (DFT) / fast Fourier transform (FFT) operation was applied to the Zadoff-Chu sequence prior to application of an inverse fast Fourier transform (IFFT) operation.

7. The method of claim 1, wherein the parameter is at least one of a symbol location or a tone location at which the reference signal is carried.

8. The method of claim 1, further comprising leveraging the detected type of waveform to at least one of decode or demodulate the uplink transmission.

9. A wireless communications apparatus, comprising:
a memory that retains instructions related to obtaining an uplink transmission that includes a demodulation reference signal, identifying a parameter associated with the received demodulation reference signal, and detecting whether a single carrier-frequency division multiple access (SC-FDMA) waveform or an orthogonal frequency division multiple access (OFDMA) waveform is utilized for the uplink transmission based on the recognized parameter, and wherein the SC-FDMA waveform utilizes single carrier modulation and frequency domain equalization; and
a processor, coupled to the memory, configured to execute the instructions retained in the memory.

10. The wireless communications apparatus of claim 9, wherein the memory further retains instructions related to transmitting a signal indicating a base station selected type of waveform to be used for the uplink transmission.

11. The wireless communications apparatus of claim 9, wherein the parameter is one or more of an identity of a Zadoff-Chu sequence associated with the demodulation reference signal, a symbol location of the demodulation reference signal, or a tone location of the demodulation reference signal.

12. The wireless communications apparatus of claim 11, wherein the memory further retains instructions related to analyzing the identity of the Zadoff-Chu sequence based upon energy detection after correlation with a local copy of an assumed Zadoff-Chu sequence.

13. A wireless communications apparatus that enables recognizing utilized waveform type in a wireless communication environment, comprising:
   means for identifying a parameter associated with a reference signal included within a received uplink transmission; and
   means for detecting whether a single carrier-frequency division multiple access (SC-FDMA) waveform or an orthogonal frequency division multiple access (OFDMA) waveform is utilized for the uplink transmission based on the recognized parameter, and wherein the SC-FDMA waveform utilizes single carrier modulation and frequency domain equalization.

14. The wireless communications apparatus of claim 13, further comprising means for transmitting a signal to control the type of waveform utilized for the uplink transmission.

15. The wireless communications apparatus of claim 13, wherein the parameter is one or more of an identity of a Zadoff-Chu sequence associated with the reference signal, a symbol location of the reference signal, or a tone location of the reference signal.

16. A non-transitory computer-readable medium having computer executable code stored thereon, comprising:
   code for identifying a parameter associated with a reference signal included within a received uplink transmission; and
   code for detecting whether a single carrier-frequency division multiple access (SC-FDMA) waveform or an orthogonal frequency division multiple access (OFDMA) waveform is utilized for the uplink transmission based on the recognized parameter, and wherein the SC-FDMA waveform utilizes single carrier modulation and frequency domain equalization.

17. The non-transitory computer-readable medium of claim 16, further comprising:
   code for transmitting a signal to control the type of waveform utilized for the uplink transmission.

18. The non-transitory computer-readable medium of claim 16, wherein the parameter is one or more of an identity of a Zadoff-Chu sequence associated with the reference signal, a symbol location of the reference signal, or a tone location of the reference signal.

19. A wireless communications apparatus, comprising:
   a processor configured to:
   receive an uplink transmission that includes a demodulation reference signal;
   recognize a parameter associated with the received demodulation reference signal, wherein the parameter is at least one of an identity of a Zadoff-Chu sequence associated with the demodulation reference signal, a symbol location of the demodulation reference signal, or a tone location of the demodulation reference signal;
   detect whether a single carrier-frequency division multiple access (SC-FDMA) waveform or an orthogonal frequency division multiple access (OFDMA) waveform is utilized for the uplink transmission based on the recognized parameter, and wherein the SC-FDMA waveform utilizes single carrier modulation and frequency domain equalization; and
   decode the uplink transmission based upon the detected type of waveform.

* * * * *